United States Patent Office 3,473,252
Patented Oct. 21, 1969

3,473,252
METHOD OF DESTROYING RODENTS
Fritz Kramer, 60—11 Broadway, Woodside, N.Y. 11377;
John C. Wilson, Jr., 6 Locust Lane, and John Krasinski,
Brookville Road, both of Glen Head, N.Y. 11545
No Drawing. Filed Sept. 11, 1967, Ser. No. 666,928
Int. Cl. A01m *25/00;* A01k *13/00*
U.S. Cl. 43—124                                    10 Claims

ABSTRACT OF THE DISCLOSURE

Rodents, particularly rats, are killed in their confined habitat by substantially filling the habitat under fluid pressure with a platic foam which quickly hardens, thereby enveloping and trapping the rodents and making the habitat inaccessible to other rodents. Catalyzed foams of urea formaldehyde mixtures propelled by nitrogen are preferred because of their low cost, their lack of toxicity when cured, the asphyxiating effect of the propellent, and the deterrent effect of a slight excess of formaldehyde retained in the closed cells of the foam. The free formaldehyde also prevents rapid decomposition of the trapped rat corpses.

Background of the disclosure

This invention relates to a method of destroying rodents, and particularly to a method of destroying rats in dwellings and like buildings, and of making the buildings substantially permanently ratproof.

The tools available heretofore in the fight against parasitic rodents, specifically rats, were poisoned bait and traps, and development work has barely begun on biological methods intended to prevent procreation of the rodents. The methods applied so far have been notably unsuccessful in permanently ratproofing buildings, and were not fully effective in eradicating the rats hidden in the buildings at the time of the eradication attempt. Rats are ingenious in recognizing and avoiding danger.

The object of the present invention is a method which kills all rodents such as rats, mice, moles, hedgehogs, and gophers, hidden in hollow spaces in and near a building, and which makes such hollow spaces inaccessible to other rodents trying to enter the building or its surroundings.

Summary of the invention

In its basic aspects, the invention resides in substantially filling the spaces which provide confined habitats to the rodents with a foam whose liquid phase mainly consists of a hardenable synthetic resin composition, enveloping the rodents present in the habitat in the foam, and permitting the foam to harden while it envelops the rodents. The immobilized animals die, normally of asphyxiation. The hardened foam prevents other animals from entering the previously hollow space.

If the hardenable resin composition includes formaldehyde as a resin forming component and the formaldehyde present is in slight excess, the hardened foam traps a small amount of free formaldehyde for a long time, thereby making the foam unpalatable to rodents. The excess formaldehyde prevents rapid decomposition of rodent corpses trapped in the hard foam.

Air is an adequate propellant for driving the hardenable plastic foam into crevices and all parts of even an extended labyrinth of hollow wall spaces present in rat infested old buildings, and rats normally consume the air available to them before they can burrow through the initially soft foam and escape. It is preferred, however, to use nitrogen or other gases free from significant amounts of molecular oxygen for inflating the cells of the foam, and for propelling the foam under fluid pressure into the rodents' habitat. The nitrogen displaces the air initially present and causes the rats to asphyxiate. While healthy rats can survive for approximately seven minutes when submersed in water, they have been found in laboratory tests to die within 90 seconds when enveloped in a plastic foam of this invention which is inflated and propelled by nitrogen.

The synthetic resin composition preferred at this time for the purpose of the invention because of its very low cost consists essentially of urea and formaldehyde in an aqueous medium in which they may form a dispersed prepolymer. The solution is mixed immediately prior to application with a small amount of acid as a hardening or curing agent which catalyzes the condensation reaction between urea and formaldehyde, with a sufactant effective as a foaming agent in the slightly acid mixture ultimately obtained, and with an expanding agent which is gaseous at normal temperature, that is, between approximately 0° C. and 40° C. The foam mixture is then injected under pressure into the confined habitat of the rodents.

Phenol formaldehyde resins and melamine formaldehyde resins may also be employed without major changes in the procedure outline above, but are prohibitively expensive at this time. It is furthermore possible to achieve at least some of the advantages of this invention with resin compositions not based on formaldehyde condensation products. Polyurethane foams which quickly harden may be formed in a known manner by jointly pouring a resin blend and a prepolymer based on an isocyanate into the rats' habitat. The liquid mixture expands about 30 to 70 times as the components react with each other exothermally and release carbon dioxide which contributes to the quick extermination of the rodents present. Polyurethane foam, however, is not economical in the process of this invention at the present time, and does not offer significant advantages over urea formaldehyde foam.

Similar considerations militate against the use of foams prepared by mixing polyethylene, polystyrene, polyvinyl chloride, or other thermoplastic materials in the molten state with inert gas bubbles, in a known manner. The hot foam-like mixture may be injected into rat holes, and permitted to solidify by cooling. While laboratory tests indicate that such a modification of the invention is successful when applied to rather shallow holes, it is not practical at this time.

Under most circumstances, it is uneconomical to use propelling and foaming agents other than air or nitrogen. Carbon dioxide, florocarbon 11, and fluorocarbon 12 may be employed as propellents, foaming and frothing agents in a conventional manner under special conditions, but other inert and non-toxic fluids while operative, do not offer advantages which would justify their cost.

Neither air nor nitrogen are capable of reacting with a building or its contents. Nitrogen injected under pressure into space confined in the walls or floors of a building is as harmless to the inhabitants of the building as injected air.

The amount of excess formaldehyde present in the cells of the cured and hardened urea formaldehyde condensate of the invention does not produce a perceptible odor in the treated building, and is too small to produce toxic effects if children or pets should accidentally chew the cured resin. The free formaldehyde is not believed to contribute to the extremely rapid death of rats trapped in the foam when the latter is propelled and expanded by means of nitrogen.

Description of a preferred embodiment of the invention

The method of the invention is highly effective in buildings such as old tenements heavily infested by rats which emerge night after night from openings in the walls and floors of the buildings, and in which poisoned bait, clogging of the openings with wads of steel wool, trapping, and similar measures bring at best temporary and incomplete relief from the pests.

Urea-formaldehyde foam is blown into all accessible openings in the structure which lead into the confined habitat of the rats. The necessary apparatus may be of the type disclosed in Bauer Patent No. 2,860,856. One of its storage tanks is filled with an aqueous solution of 300 g./l. urea containing formaldehyde in an excess of 4% over that needed for condensation with the urea. The other storage tank is provided with an aqueous solution of phosphoric acid as a curing and hardening agent, and 2.0% of a sorbitan monopalmitate polyoxyalkylene derivative (Tween 40) as a surface active foaming agent.

The two solutions are transferred from the storage tanks at equal rates to a mixing tank by the pressure of nitrogen in a connected cylinder having a pressure of approximately 60–70 p.s.i.g., the two liquids are intimately mixed with each other and with nitrogen in the mixing tank and the mixture is released in a stream from the latter through a nozzle as a foam which rapidly expands upon leaving the nozzle.

The stream is injected into holes in the building which are suspected of harboring rats until the foam emerges or is about to emerge from all visible openings in the walls and floors. It hardens approximately one minute after mixing of the ingredients. This is amply sufficient for filling even an extended continuous network of corridors in a wall, in and under floors, and in the surrounding soil.

Rats and other rodents caught in the flowing foam are quickly killed. Their corpses are embalmed by the available free formaldehyde. The structure no longer provides living and breeding space for newcomers from other rodent colonies. The hardened foam retains enough formaldehyde in its closed cells over a very long period to discourage any attempt by rodents to enter the building by gnawing through the unpalatable material filling previously open entrance ways.

Except for animals occasionally entering the building through doors left open, no live rats can be found there after the treatment. The rats accidentally admitted do not find hiding places and cannot establish families. They leave spontaneously.

As is well known, acids other than phosphoric acid may be employed for catalyzing the condensation reaction between urea and formaldehyde. Sulfuric, toluenesulfonic, phenolsulfonic, hydrochloric, and oxalic acid have been used commercially. The catalyst in the known condensation reaction is not itself a part of this invention.

Similarly the choice of the surface active agent which lends stability to the bubbles of the foam until the liquid phase hardens, is not critical, and most commercial nonionic wetting agents are effective.

While the invention has been described with particular reference to a specific embodiment, it is to be understood that it is not limited thereto, but is to be construed broadly.

What is claimed is:

1. A method of destroying a rodent in a confined habitat thereof which comprises propelling into the habitat a foam unpalatable to said rodents, enveloping said rodent while in said habitat with said foam, said foam essentially consisting of bubbles in a gaseous phase dispersed in a liquid phase, the liquid phase of said foam consisting essentially of a hardenable synthetic resin composition, and the amount of said foam being sufficient substantially to fill said habitat, and permitting said foam to harden while enveloping said rodent.

2. A method as set forth in claim 1, wherein said foam is injected into said habitat under pressure.

3. A method as set forth in claim 2, wherein the gaseous phase of said foam is substantially free of molecular oxygen.

4. A method as set forth in claim 3, wherein said gaseous phase essentially consists of nitrogen.

5. A method as set forth in claim 1, wherein said synthetic resin composition is an aqueous dispersion of a member of the group consisting of urea, phenol, and melamine, containing an amount of formaldehyde in slight excess over the amount required to form a resin by condensation reaction with said member, a hardening agent adapted to catalyze said condensation reaction, and a surface active agent effective to reduce the surface tension of said dispersion.

6. A method as set forth in claim 5, wherein said member is urea and said hardening agent is an acid.

7. A method as set forth in claim 6, wherein the gaseous phase of said foam essentially consists of nitrogen.

8. A method of rat-proofing a building having a hollow space adapted to provide a confined habitat for rodents which comprises:
 (a) substantially filling said space with a foam unpalatable to rats,
  (1) the liquid phase of said foam essentially consisting of a hardenable synthetic resin composition, and
  (2) the gaseous phase of said foam essentially consisting of nitrogen;
 and
 (b) permitting said foam to harden in said space.

9. A method as set forth in claim 8, wherein said synthetic resin composition includes an aqueous dispersion of urea containing an amount of formaldehyde in slight excess over the amount required to form a resin by condensation reaction with said urea, a hardening agent adapted to catalyze said condensation reaction in said dispersion, and a surface active agent in an amount sufficient to stabilize said foam until the same hardens.

10. A method as set forth in claim 9, wherein said hardening agent is an acid.

References Cited

UNITED STATES PATENTS

| | | | |
|---|---|---|---|
| 2,941,900 | 6/1960 | Schroder-Stranz | 117—72 |
| 3,162,152 | 12/1964 | Regenstein et al. | 111—7 |
| 3,229,441 | 1/1966 | Heffner | 52—743 |
| 3,357,146 | 12/1967 | Gartrell | 52—309 |
| 3,361,775 | 1/1968 | Gibbons | 52—517 X |

ALDRICH F. MEDBERY, Primary Examiner

U.S. Cl. X.R.

43—125; 52—101, 309